United States Patent [19]

Wada

[11] Patent Number: 5,960,845
[45] Date of Patent: Oct. 5, 1999

[54] PNEUMATIC TIRE

[75] Inventor: Mitsuhiro Wada, Hyogo, Japan

[73] Assignee: Sumitomo Rubber Industries, Ltd., Kobe, Japan

[21] Appl. No.: 08/863,308

[22] Filed: May 27, 1997

Related U.S. Application Data

[63] Continuation of application No. 08/316,476, Oct. 3, 1994, abandoned, which is a continuation-in-part of application No. 08/277,107, Jul. 20, 1994, abandoned.

[30] Foreign Application Priority Data

Jul. 23, 1993 [JP] Japan ................................ 5-202021
Jul. 4, 1994 [JP] Japan ................................ 6-173126

[51] Int. Cl.$^6$ .............................. B60C 9/18; B60C 11/13; B60C 103/00
[52] U.S. Cl. ................................ 152/209.23; 152/209.27; 152/526; 152/903
[58] Field of Search ........................... 152/209 R, 209 A, 152/209 D, 526, 209.23, 209.27, 903

[56] References Cited

U.S. PATENT DOCUMENTS

| | | | |
|---|---|---|---|
| 3,104,693 | 9/1963 | Bolenbach | 152/209 R |
| 4,298,046 | 11/1981 | Herbelleau et al. | 152/209 R |
| 4,819,704 | 4/1989 | Misawa et al. | 152/209 R |
| 5,200,008 | 4/1993 | Enterline et al. | 152/209 R |
| 5,225,010 | 7/1993 | Shisheng | 152/209 R |
| 5,353,855 | 10/1994 | Kajiwara et al. | 152/209 R |

FOREIGN PATENT DOCUMENTS

| | | | |
|---|---|---|---|
| 384182 | 8/1990 | European Pat. Off. | 152/209 R |
| 605849 | 7/1994 | European Pat. Off. | 152/209 R |
| 41202 | 3/1982 | Japan | 152/209 D |
| 62-261508 | 11/1987 | Japan | 152/209 R |
| 49505 | 3/1988 | Japan | 152/209 R |
| 309806 | 12/1989 | Japan | 152/209 D |
| 2-293205 | 12/1990 | Japan | 152/209 R |
| 169720 | 7/1991 | Japan | 152/209 R |
| 100706 | 4/1992 | Japan | 152/209 R |
| 5-270214 | 10/1993 | Japan | 152/209 R |

*Primary Examiner*—Steven D. Maki

[57] ABSTRACT

A pneumatic tire having two main grooves in the tread that are provided symmetrically with the equatorial plane of the pneumatic tire and which extend in the circumferential direction of the pneumatic tire. The tread is divided into a central portion formed between the main grooves and shoulder portions formed outward of the main grooves in the direction of tire's width. Each of the central and shoulder portions is provided with a plurality of lateral grooves that extend in the direction of tire's width. The lateral grooves in the central portion and those in each shoulder portion are inclined in opposite directions with respect to the axial direction of the tire. All walls of the central lateral grooves are inclined in the same direction with respect to a line in the radial direction of the tire. All walls of the shoulder lateral grooves are inclined in opposite directions to the walls of the central lateral grooves with respect to a line in the radial direction of the pneumatic tire.

10 Claims, 9 Drawing Sheets

TABLE 1

| | EXAMPLE 1 | EXAMPLE 2 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|
| TIRE SIZE AND DIRECTION OF THE TIRE RUNNING ON THE ROAD | 185/60R14 LEFT | 185/60R14 LEFT | 185/60R14 LEFT | 185/60R14 LEFT | 185/60R14 LEFT | 185/60R14 LEFT | 185/60R14 LEFT |
| DIRECTION OF THE OUTERMOST LAYER | RIGHT | RIGHT | RIGHT | LEFT | LEFT | LEFT | RIGHT |
| ANGLE OF THE OUTERMOST LAYER | 22° | 22° | 22° | 22° | 22° | 22° | 22° |
| FIGURE OF THE TREAD PATTERN | FIG. 1 | FIG. 1 | FIG. 1 | FIG. 1 | FIG. 1 | FIG. 1 | NOT SHOWN |
| PATTERN SIZE — WIDTHS [mm] TREAD (TW) CENTRAL PORTION (CW) SHOULDER PORTION (SW) MAIN GROOVE (GW) CENTRAL SUB-GROOVE (MW) FIRST SUB-GROOVE (LW1) SECOND SUB-GROOVE (LW2) | 152 62 36 9 7.5 3.0 2.5 | 152 62 36 9 7.5 3.0 2.5 | 152 62 36 9 7.5 3.0 2.5 | 152 62 36 9 7.5 3.0 2.5 | 152 62 36 9 7.5 3.0 2.5 | 152 62 36 9 7.5 3.0 2.5 | NOT SHOWN |
| GROOVES' DEPTH [mm] CENTRAL LATERAL GROOVE DIRECTION AND ANGLE (θc) SHOULDER LATERAL GROOVE DIRECTION AND ANGLE (θS) | 8 RIGHT 20° TO 50° LEFT 30° TO 35° | 8 RIGHT 20° TO 50° LEFT 30° TO 35° | 8 RIGHT 20° TO 50° LEFT 30° TO 35° | 8 RIGHT 20° TO 50° LEFT 30° TO 35° | 8 RIGHT 20° TO 50° LEFT 30° TO 35° | 8 RIGHT 20° TO 50° LEFT 30° TO 35° | |
| GROOVE SHAPE | FIGS. 11(A) TO 11(E) | FIGS. 12(A) TO 12(E) | FIGS. 13(A) TO 13(E) | FIGS. 11(A) TO 11(E) | FIGS. 12(A) TO 12(E) | FIGS. 13(A) TO 13(E) | NOT SHOWN |
| RESIDUAL CORNERING FORCE [kgf] | +3.5 | +2.2 | −2.0 | −9.0 | −10.2 | −14.5 | +6.5 |

FIG. 5

TABLE 2

| | | Example 3 | Example 4 | Comparative Example 6 | Comparative Example 7 | Comparative Example 8 | Comparative Example 9 |
|---|---|---|---|---|---|---|---|
| Tire Size and Direction of the Tire Running on the Road | | 185/60R14 Right | 185/60R14 Right | 185/60R14 Right | 185/60R14 Right | 185/60R14 Right | 185/60R14 Right |
| Direction of the Outermost Layer | | Left | Left | Left | Right | Right | Right |
| Angle of the Outermost Layer | | 22° | 22° | 22° | 22° | 22° | 22° |
| Figure of the Tread Pattern | | FIG. 1 | FIG. 1 | FIG. 1 | FIG. 1 | FIG. 1 | FIG. 1 |
| Pattern Size | Width [mm] Tread (TW) Central Portion (CW) Shoulder Portion (SW) Main Groove (GW) Central Sub-Groove (MW) First Sub-Groove (LW1) Second Sub-Groove (LW2) | 152.0 62.0 36.0 9.0 7.5 3.0 2.5 | 152.0 62.0 36.0 9.0 7.5 3.0 2.5 | 152.0 62.0 36.0 9.0 7.5 3.0 2.5 | 152.0 62.0 36.0 9.0 7.5 3.0 2.5 | 152.0 62.0 36.0 9.0 7.5 3.0 2.5 | 152.0 62.0 36.0 9.0 7.5 3.0 2.5 |
| | Grooves' Depth [mm] Central Lateral Groove Direction and Angle (θc) Shoulder Lateral Groove Direction and Angle (θS) | 8 LEFT 20° to 50° Right 30° to 35° | 8 LEFT 20° to 50° Right 30° to 35° | 8 LEFT 20° to 50° Right 30° to 35° | 8 LEFT 20° to 50° Right 30° to 35° | 8 LEFT 20° to 50° Right 30° to 35° | 8 LEFT 20° to 50° Right 30° to 35° |
| Groove Shape | | FIGs. 11(A) to 11(E) | FIGs. 12(A) to 12(E) | FIGs. 13(A) to 13(E) | FIGs. 11(A) to 11(E) | FIGs. 12(A) to 12(E) | FIGs. 13(A) to 13(E) |
| Residual Cornering Force [kgf] | | −5.2 | −3.3 | +2.2 | +8.2 | +10.4 | +15.1 |

PNEUMATIC TIRE

This application is a continuation of application Ser. No. 08/316,476 filed on Oct. 3, 1994 now abandoned, which is a continuation-in-part of application Ser. No. 08/277,107 filed on Jul. 20, 1994, both of which are now abandoned.

BACKGROUND OF THE INVENTION

The present invention relates to a pneumatic tire in which the effect of residual cornering force due to the tread pattern is sufficiently suppressed to provide improved maneuverability.

To assure effective water drainage, the surfaces of ordinary roads have cants or are inclined in such a way that they are the highest in the central area while decreasing in height toward either shoulder of the road. Hence, a vehicle running straight on a straight road is subjected to a force exerted by the road which urges the vehicle to go down the cant, whereby it has a tendency to swerve in that direction.

As a matter of fact, depending on various tire factors such as construction and shape, the tire itself can be an effective source of lateral force, which is commonly referred to as "residual cornering force". If the residual cornering force balances with the lateral force developed by the cant, the vehicle will not swerve.

The residual cornering force is generally held to be highly susceptible to the direction of the belt placed under the tread, particularly with respect to the direction of the belt cords that lie radially outward of the tire. Accordingly, the direction in which the belt cords are attached is in turn determined by the cant of the road.

Consider, for example, the case where vehicles are required to run on the left side of the road; since the road surface on the left side is provided with a cant sloping downward to the left, some swerving of vehicles can be prevented if the cord in the outermost layer of the belt is attached in a direction sloping upward to the right as seen from the outside of the tire (see FIG. 9). In the other case where vehicles are required to run on the right side of the road, the road surface on the right side is provided with a cant sloping downward to the right; therefore, some swerving of vehicles can be prevented if the cord in the outermost layer of the belt is attached in a direction sloping upward to the left as seen from the outside of the tire (see FIG. 10).

In fact, however, the residual cornering force is occasionally developed by the tread pattern and it has been difficult to develop an appropriate amount of residual cornering force by simply adjusting the direction of attachment of belt cords.

A brief description of the developing mechanism of the residual cornering force is given here. Since the crown portion of the tire tread has a greater radius of rotation than the shoulder portion, a tractive force works on the blocks provided in the crown portion and a braking force on the blocks in the shoulder portion. Here, the blocks are twisted in the flow direction of the tread pattern, namely, in the direction determined by the inclination of the block sides relative to the direction of tread's width and the resulting torque will develop the residual cornering force.

Consider, for example, a prior art tire having the block pattern shown in FIG. 7(A). A block Bcr provided in the crown portion is inclined rearward in the direction of tire rotation toward the external part of the tread in the direction of its width, whereas a block Bsh in the shoulder portion is inclined forward in the direction of tire rotation toward the external part of the tread in the direction of its width, whereby a tractive force Ft works at the internal front end of block Bcr and a braking force Fb at the external front end of block Bsh. As a result, the two blocks Bcr and Bsh are twisted in outer directions and a torque $T_R$ rotating clockwise will develop in the area of the tread that is right to the center of the tread shown (the torque is counterclockwise in the tread area on the left side), whereby the self-aligning torque SAT will increase and, hence, the residual cornering force will increase as a whole (see FIG. 8(A)).

Consider also a prior art tire having the block pattern shown in FIG. 7(B). A block Bcr provided in the crown portion is inclined forward in the direction of tire rotation toward the external part of the tread in the direction of its width, whereas a block Bsh in the shoulder portion is inclined rearward in the direction of tire rotation toward the external part of the tread in the direction of its width, whereby a tractive force Ft works at the external front end of block Bcr and a braking force Fb at the internal front end of block Bsh. As a result, the two blocks Bcr and Bsh are twisted in inner directions and a torque $T_L$ rotating counterclockwise will develop in the area of the tread that is right to the center of the tread shown (the torque is clockwise in the tread area on the left side), whereby the self-aligning torque SAT will decrease and, hence, the residual cornering force will decrease as a whole (see FIG. 8(B)).

As described above, the residual cornering force taken as a whole varies with the flow direction of the tread pattern and, depending on the tread pattern, a great force will develop in an opposite direction to the residual cornering force determined by the direction of attachment of belt cords, causing the vehicle to slip down the cant of the road.

An object, therefore, of the present invention is to provide a pneumatic tire in which the effect to be caused by the tread pattern on the residual cornering force is sufficiently suppressed to insure enhanced maneuverability.

SUMMARY OF THE INVENTION

This object of the invention can be attained by a pneumatic tire having two main grooves in the tread that are provided symmetrically with respect to the equatorial plane of the pneumatic tire and which extend in the circumferential direction of the pneumatic tire. The tread is divided into the central portion which is formed between the main grooves and shoulder portions which are formed outward of the main grooves in the direction of tire's width. Each of the central and shoulder portions being provided with a plurality of lateral grooves that extend in the direction of tire's width. The lateral grooves in the central portion and those in each shoulder portion are inclined in opposite directions with respect to the axial direction of the tire. All walls of the central lateral grooves are inclined in the same direction with respect to a line in the radial direction of the tire. And all walls of the shoulder lateral grooves are inclined in opposite directions to the walls of the central lateral grooves with respect to a line in the radial direction of the pneumatic tire.

In one preferred embodiment, the cord in the outermost layer of the belt is inclined in the same direction as the lateral grooves in the central portion.

In another preferred embodiment, sub-grooves continuous in the circumferential direction of the tire are provided in either the central portion or each shoulder portion or both.

In another preferred embodiment, the lateral grooves in the central portion are open at one end to the main grooves but closed at the other end. And the lateral grooves in each shoulder portion are open to the main grooves and the tread end at opposite ends.

In the tire according to a preferred embodiment of the invention, the lateral grooves in the central portion of the tread and those in each shoulder portion are inclined in opposite directions with respect to the axial direction of the tire. All walls of the lateral grooves in the central portion are inclined in the same direction in depth with respect to a line in the radial direction of the tire, and all walls of the lateral grooves in each shoulder portion are inclined in opposite directions to the walls of the lateral grooves in the central portion with respect to a line in the radial direction of the tire. On account of this arrangement, both the tractive force Ft working in the crown blocks located in the central portion and the braking force Fb working in the shoulder blocks in the shoulder portions are sufficiently reduced to decrease torque development, thereby suppressing the changes in self-aligning torque SAT. At the same time, the stiffness of the crown and shoulder blocks is varied in the running direction of the tire not only in the front part but also in the rear part, whereby the tractive force Ft and the braking force Fb are sufficiently reduced to suppress the effect that the tread pattern will cause on the residual cornering force.

If the cord in the outermost layer of the belt is inclined in the same direction as the lateral grooves in the central portion of the tread, one can insure that the residual cornering force is determined by the direction of attachment of the belt cords.

If sub-grooves continuous in the circumferential direction of the tire are provided in either the central portion of the tread or each shoulder portion or both, the lateral stiffness constant of the crown or shoulder blocks in the lateral direction can be sufficiently reduced to suppress the effect that the tread pattern will cause on the residual cornering force.

If the lateral grooves in the central portion of the tread are open at one end to the main grooves but closed at the other end and if the lateral grooves in each shoulder portion are open to the main grooves and the tread end at opposite ends, the stability of a tire running straight and, hence, its maneuverability is improved while, at the same time, the water draining performance of the tire and, hence, its wet running performance can be insured.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3(B) is a section view along line B–B' (or I–I') of FIG. 1.

FIG. 4 is a table which shows various pneumatic tires for running on the left side of the road according to the present invention as compared with conventional tires;

FIG. 5 is a table which shows various pneumatic tires for running on the right side of the road according to the present invention as compared with conventional tires;

DETAILED DESCRIPTION OF THE PREFERRED EMBODIMENTS

Figure 1:
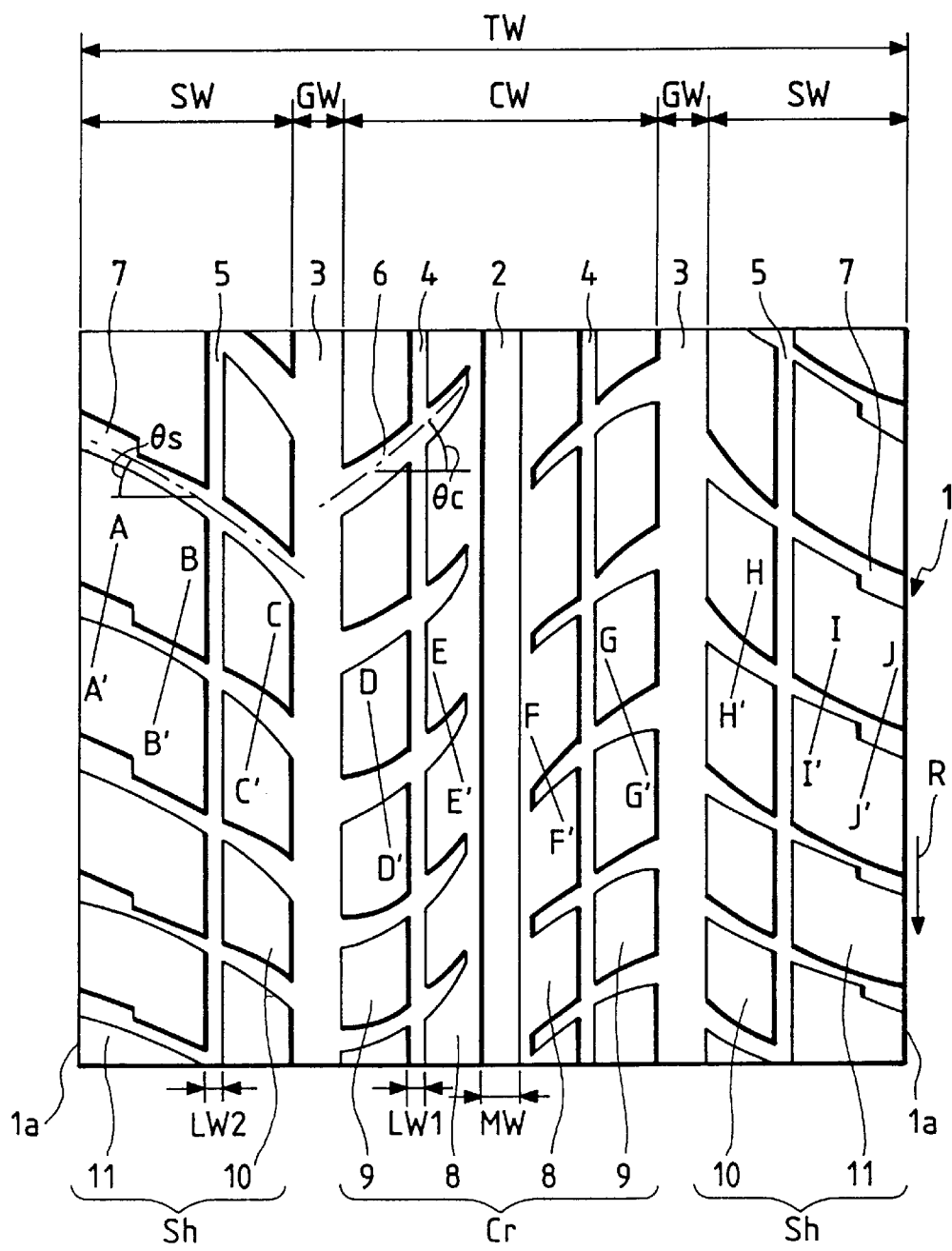
FIG. 1 is a diagram showing, in a plane view, the tread pattern of a pneumatic tire for running on the left side of the road according to the present invention.

FIG. 1 shows a pneumatic tire to be mounted on a vehicle for running on the left side of the road.

Figure 9:
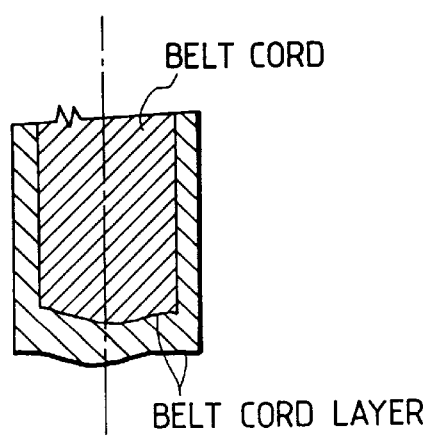
FIG. 9 is a plan view of a belt layer in which a cord is attached in a direction sloping upward to the right as seen from the outside of a tire.
Figure 10:
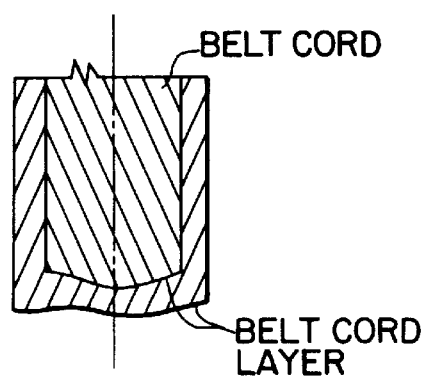
FIG. 10 is a plan view of a belt layer in which a cord is attached in a direction sloping upward to the left as seen from the outside of a tire.
Figure 12A:
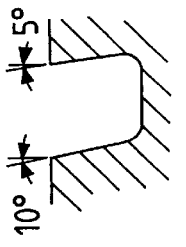
FIG. 12(A) is a cross sectional view of the grooves of Example 2 and Comparative Example 3 at A–A' and J–J' of FIG. 1.
Figure 12B:
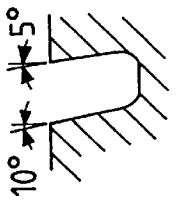
FIG. 12(B) is a cross sectional view of the grooves at B–B' and I–I'.
Figure 12C:
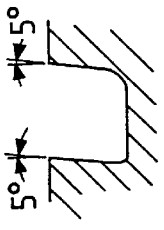
FIG. 12(C) is a cross sectional view of the grooves at C–C' and H–H'.
Figure 12D:
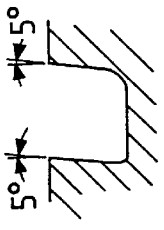
FIG. 12(D) is a cross sectional view of the grooves at D–D' and G–G'.
Figure 12E:
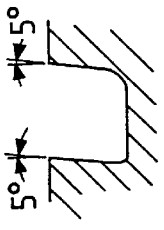
FIG. 12(E) is a cross sectional view of the grooves at E–E' and F–F'.
Figure 11A:
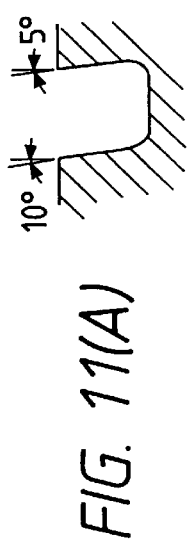
FIG. 11(A) is a cross sectional view of the grooves of Example 1 and Comparative Example 2 at A–A' and J–J' of FIG. 1.
Figure 11B:
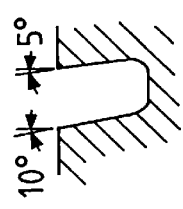
FIG. 11(B) is a cross sectional view of the grooves at B–B' and I–I'.
Figure 11C:
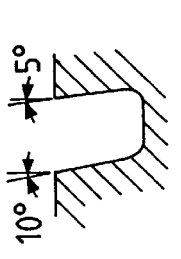
FIG. 11(C) is a cross sectional view of the grooves at C–C' and H–H'.
Figure 11D:
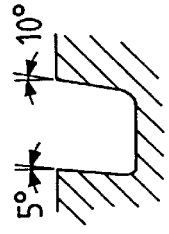
FIG. 11(D) is a cross sectional view of the grooves at D–D' and G–G'.
Figure 11E:
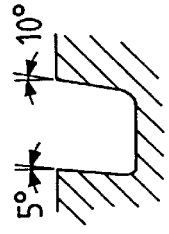
FIG. 11(E) is a cross sectional view of the grooves at E–E' and F–F'.
Figure 13A:
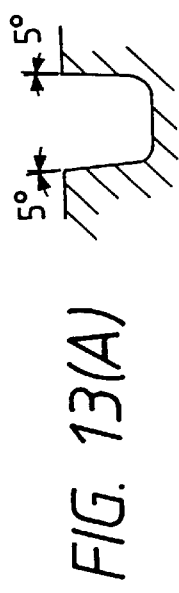
FIG. 13(A) is a cross sectional view of the grooves of Comparative Examples 1, 4, 6 and 9 at A–A' and J–J' of FIG. 1 or FIG. 2.
Figure 13B:
FIG. 13(B) is a cross sectional view of the grooves at B–B' and I–I'.
Figure 13C:
FIG. 13(C) is a cross sectional view of the grooves at C–C' and H–H'.
Figure 13D:
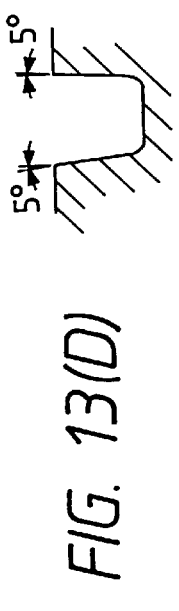
FIG. 13(D) is a cross sectional view of the grooves at D–D' and G–G'.
Figure 13E:
FIG. 13(E) is a cross sectional view of the grooves at E–E' and F–F'.

The tread 1 of the pneumatic tire shown in FIG. 1 has the cord in the outermost layer of a belt attached to slopes upward to the right as shown in FIG. 9 (or slopes upward to the left in the case of a tire to be mounted on a vehicle for running on the right side of the road as shown in FIG. 10). The tread pattern comprises: a central sub-groove 2 that is provided in the center of the tread and which extends in the circumferential direction of the tire; a pair of main grooves 3 that are provided symmetrically on each side of the central sub-groove 2 and which extend in the circumferential direction of the tire; a pair of first sub-grooves 4, each being provided between the central sub-groove 2 and each main groove 3 and extending in the circumferential direction of the tire; a pair of second sub-grooves 5 that are provided outward of the main grooves 3 in the direction of tread's width and which extend in the circumferential direction of the tire; central lateral grooves 6 that are provided on the two sides of the central sub-grooves 2 and which extend in the direction of tread's width in such a way that one end is located to be closed in the neighborhood of the central sub-groove 2 while the other end is continuous and open to the main grooves 3; and shoulder lateral grooves 7 that extend in the direction of tread's width in such a way that one end is continuous and open to the main grooves 3 while the other end reaches either tread end 1a to which it is open.

The space between the main grooves 3 is referred to as the crown or central portion Cr; the space between either main groove 3 and the associated tread end 1a is referred to as the shoulder portion Sh; the central portion Cr is set to have a width CW that ranges from 40 to 60%, preferably 50%, of the tread width TW.

The central sub-groove 2, the first sub-grooves 4 and the central lateral grooves 6 define a pair of central crown blocks 8 that are provided on the two sides of the central sub-groove 2 in the circumferential direction of the tire; the main grooves 3, the first sub-grooves 4 and the central lateral grooves 6 define outer crown blocks 9; the main grooves 3, the second sub-grooves 5 and the shoulder lateral grooves 7 define inner shoulder blocks 10; and the second sub-grooves 5 and the shoulder lateral grooves 7 define outer shoulder blocks 11.

The direction of the central lateral grooves 6 which slope upward to the right in FIG. 1 (or to the left in the case of a tire to be mounted on a vehicle for running on the right side of the road) and the direction of the shoulder lateral grooves 7 which slope upward to the left (or to the right in the case of a tire to be mounted on a vehicle for running on the right side of the road) are set to be opposite to each other with respect to the axial direction of the tire. Stated more specifically, the angle in the direction of a central lateral groove $\theta_c$, (or the acute angle the groove center line connecting the centers at two points of the width of a central lateral groove 6 forms with respect to the axial direction of the tire) and the angle in the direction of a shoulder lateral groove $\theta_s$ (or the acute angle the groove center line connecting the centers at two points of the width of a shoulder lateral groove 7 forms with respect to the axial direction of the tire) are set to be in opposite directions with respect to the axial direction of the tire.

As described above, the central lateral grooves 6 are formed in the same direction as the cord in the outermost layer of the belt (sloping upward to the right in FIG. 1).

The direction in which the tire rotates is indicated by arrow R in FIG. 1.

Figure 3A:
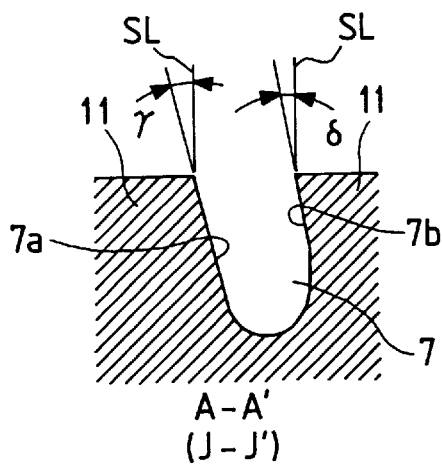
FIG. 3(A) is a sectional view along line A—A (or J–J') of FIG. 1.
Figure 3C:
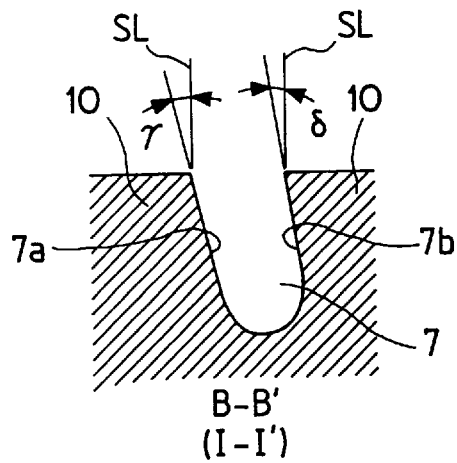
FIG. 3(B) is a sectional view along line C–C' (or H–H') of FIG. 1.
FIG. 3(D) is a sectional view along line D–D' (or G–G') of FIG. 1.
FIG. 3(E) is a sectional view along line E–E' (or F–F') of FIG. 1.
Figure 3B:
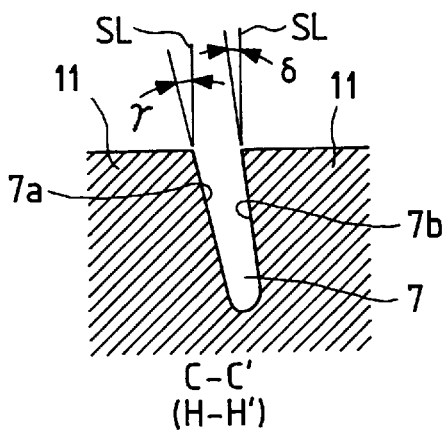
Figure 3D:
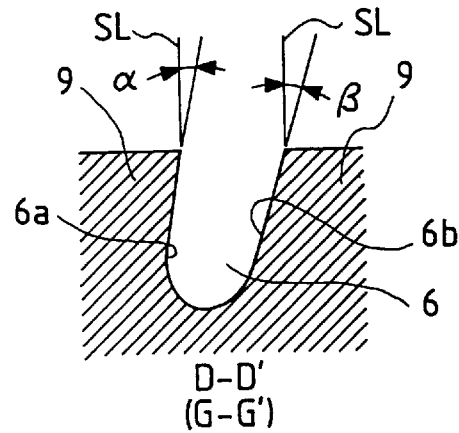
Figure 3E:
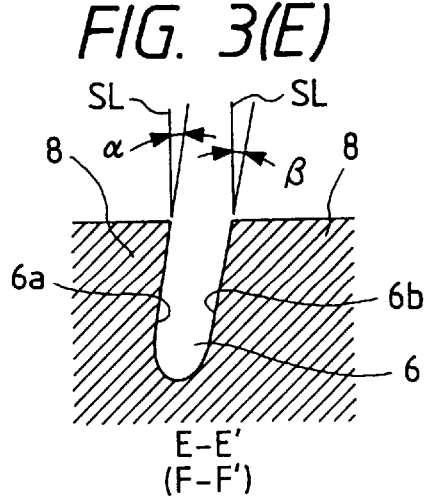
Figure 6A:
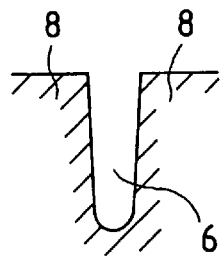
FIGS. 6(A) to 6(D) are enlarged cross sectional view of the primary parts of lateral grooves in a tire of a conventional structure.
Figure 6B:
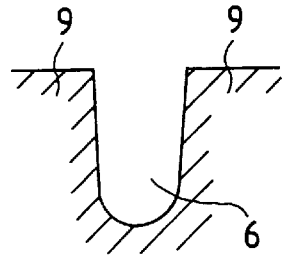
Figure 6C:
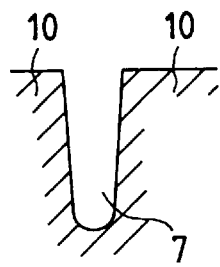
Figure 6D:
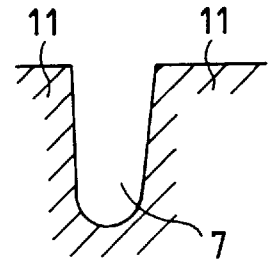
Figure 7A:
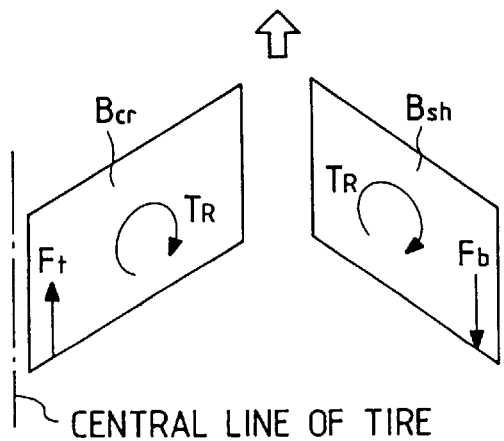
FIGS. 7(A) and 7(B) illustrate the flow directions of crown and shoulder blocks.
Figure 7B:
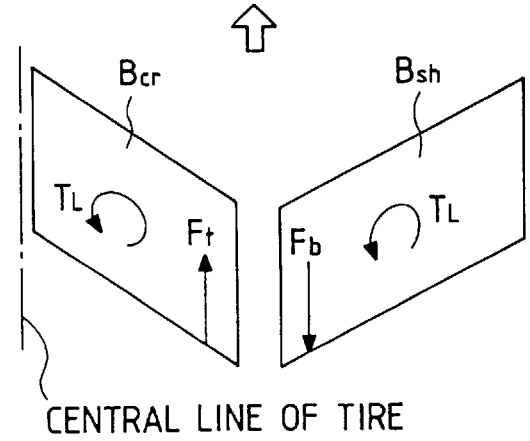
Figure 8A:
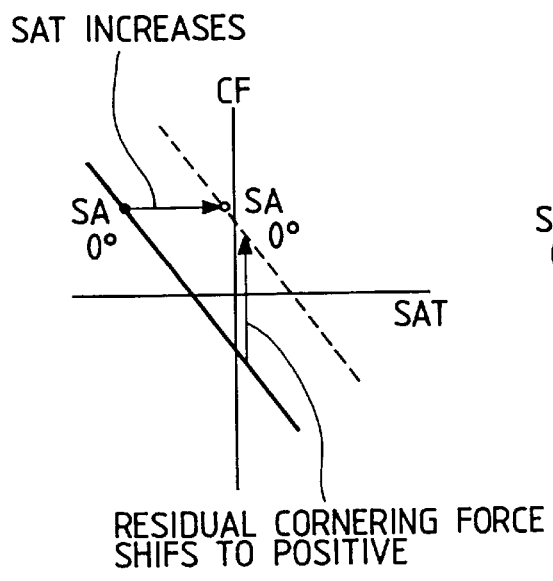
FIGS. 8(A) and 8(B) are a set of cornering force and self-aligning torque characteristic diagrams that respectively show the changes in the residual cornering force that is developed by the tread pattern shown in FIGS. 7(A) and 7(B)
Figure 8B:
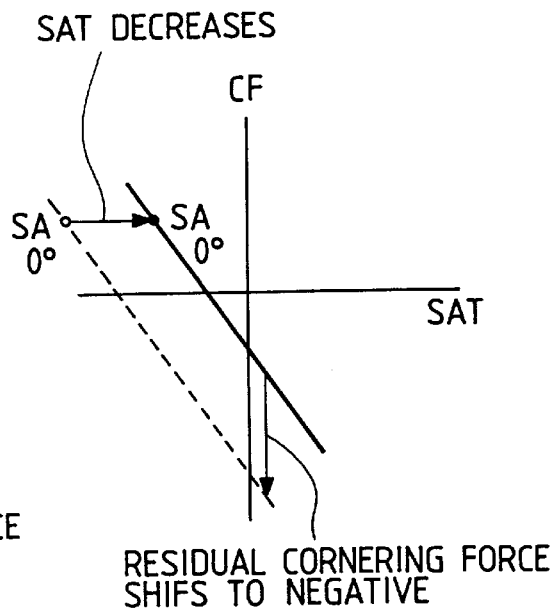

FIGS. 3(A) to 3(E) show a set of diagrams showing width sections of the central lateral groove 6 and the shoulder lateral groove 7 as they are cut across planes normal to the groove center line and the tread surface. FIG. 3(A) is a section taken along line A–A' and J–J' in FIG. 1; FIG. 3(C) is a section taken along line B–B' and I–I'; FIG. 3(B) is a section taken along line C–C' and H–H'; FIG. 3(D) is a section taken along line D–D' and G–G'; and FIG. 3(E) is a section taken along line E–E' and F–F'. In FIGS. 3(A) to 3(E), the rotating direction of tire R is shown to be from left to right.

As shown in FIGS. 3(D) and 3(E), each of the central lateral grooves 6 in the central portion Cr are formed in such a way that their walls 6a and 6b are inclined in the rotating direction of tire R from groove bottom toward its opening with reference to a line in the radial direction of tire SL (or a line normal to the tread surface), and the angle $\alpha$ of groove wall 6a at the front end in the direction R in association with crown blocks (e.g., the central crown block 8 and the outer crown block 9, where the angle $\alpha=+5°$ is set to be different from the angle $\beta$ of groove wall 6b at the rear end ($\alpha=+5°$ and $\beta=+10°$ in the example). Thus, $\alpha \ne \beta$. On the other hand, the inclinations of the walls of central lateral grooves of a tire to be mounted on a vehicle for running on the right side of the road are the same with respect to the advancing direction as a tire to be mounted on a vehicle for running on the left side of the road.

As shown in FIGS. 3(A), 3(B) and 3(C), each of the shoulder lateral grooves 7 in the shoulder portions Sh are formed in such a way that their walls 7a and 7b are inclined in a direction opposite to the rotating direction of tire R from groove bottom to its opening with reference to the line SL, and the angle $\gamma$ of groove wall 7a at the front end in the direction R in association with shoulder blocks, namely, the inner shoulder block 10 and the outer shoulder block 11 ($\gamma=-10°$ in the example under discussion) is set to be different from the angle $\delta$ of groove wall 7b at the rear end ($\delta=-5°$ in the example). Thus $\gamma \ne \delta$.

It should be noted here the angles of lateral groove walls in association with the crown blocks differ from those of lateral groove walls in association with the shoulder blocks irrespective of whether they are at the front or rear end in the rotating direction of tire R; thus $\alpha \ne \gamma$, $\beta \ne \gamma$, $\alpha \ne \delta$, and $\beta \ne \delta$.

With the arrangement described above, the crown blocks in the central portion Cr, namely, the central crown blocks 8 and the outer crown blocks 9, are sufficiently reduced in stiffness in the rotating direction of tire R so that a smaller tractive force Ft will develop. Further, the shoulder blocks in the shoulder portions Sh, namely, the inner shoulder blocks 10 and the outer shoulder blocks 11, are sufficiently reduced in stiffness in the direction R so that a smaller braking force Fb will develop. As a result, torque development is sufficiently reduced to suppress the changes in self-aligning torque SAT, thereby reducing the residual cornering force due to the tread pattern.

A more detailed discussion is made below of the actions which influence a tire to be mounted on a vehicle for running on the left side of the road. In the example, the cord in the outermost layer of the belt is attached in the opposite direction (sloping upward to the right) and, hence, the residual cornering force that is developed by the belt will work in a direction facing the right side of FIG. 1.

In the tire of FIG. 1, the central lateral grooves 6 are formed to slope upward to the right whereas the shoulder lateral grooves 7 are formed to slope downward to the right; therefore, the residual cornering force due to the tread pattern will work in a direction facing the left side of FIG. 1, or in opposite direction to the residual cornering force developed by the belt. However, as described hereinabove, the groove walls associated with the crown blocks are inclined in opposite directions to the groove walls associated with the shoulder blocks with reference to the radial line SL while, at the same time, the angles of the groove walls at the front end in the rotating direction of tire R are set to vary from those at the rear end irrespective of whether the grooves are associated with the crown blocks or shoulder blocks; as a result of these arrangements, the residual cornering force due to the tread pattern is sufficiently reduced to suppress its effect on the overall residual cornering force.

It should be added that a tire to be mounted on a vehicle for running on the right side of the road will perform in the same manner to produce the same result if the direction of attachment of the cord in the outermost layer of the belt (see FIG. 10), as well as the directions of the central and shoulder lateral grooves (see FIG. 2) are reversed from the case of the example under discussion.

Results of evaluation of examples which embody the present invention and comparative examples which represent various conventional constitutions will be described with reference to Table 1 (FIG. 4) and Table 2 (FIG. 5).

Table 1 shows the results of measuring residual cornering forces of Examples 1, 2 and Comparative Examples 1 to 5 for running on the left side of the road. All of these tire size are 185/60R14. The Examples 1, 2 and the Comparative Examples 1 to 4 have a tread pattern the same as shown in FIG. 1 and have same size and specification as each other. The Comparative Example 5, which is a plane tire, has no groove, that is no tread pattern.

With regard to the Examples 1, 2 and the Comparative Examples 1 and 5, the direction of an outermost belt cord layer is inclined upward to the right and the inclination angle set at 22°. In the Comparative Examples 2, 3 and 4, the direction of an outermost belt cord layer is inclined upward to the left and the inclination angle set at 22°.

More specifically, the size and specification of the tread pattern on the Examples 1, 2 and the Comparative Examples 1 to 4 are follows: TW (the tread width)=152 mm; CW (the width of the central portion Cr)=62 mm; SW (the width of the shoulder portion Sh)=36 mm; GW (the width of the main grooves 3)=9 mm; MW (the width of the central sub-groove 2)=7.5 mm; LW1 (the width of the first sub-grooves 4)=3.0 mm; LW2 (the width of the second sub-grooves 5)=2.5 mm; the direction of the central lateral grooves 6 is inclined upward to the right; θc (the angle in the direction of the central lateral grooves 6)=20° to 50°; the direction of the shoulder lateral grooves 7 is inclined upward to the left; θs (the angle in the direction of the shoulder lateral grooves 7)=30° to 35°; and all of the groove depth is 8 mm.

In Table 1, the expression "inclined upward to the left" is defined by "inclined upward to left when one standing on the equator plane of a tire sees the tire from the outside in the radius direction." This definition also applies to Table 2.

In the Example 1, α (the angle of the wall at the front end of the central lateral grooves 6)=+5°; and β (the angle of the wall at the rear end of the central lateral grooves 6)=+10°. (See cross sectional views of D–D', E–E', F–F' and G–G'.) And, in the Example 1, γ (the angle of the wall at the front end of the shoulder lateral grooves 7)=−10°; and δ (the angle of the wall at the rear end of the shoulder lateral grooves 7)=−5°. (See cross sectional views of A–A', B–B', C–C', H–H', I–I' and J–J'.) (Here, plus and minus of the angle are defined in such a manner that "plus" means the angle measured toward the tire rotational direction and "minus" means the angle measured opposite to the tire rotational direction. This definition also applies to Table 2.)

In the Example 2, α (the angle of the wall at the front end of the central lateral grooves 6)=+5°; and β (the angle of the wall at the rear end of the central lateral grooves 6)=+5°. (Thus α=β.) And, in the Example 2, γ (the angle of the wall at the front end of the shoulder lateral grooves 7)=−10°; and δ (the angle of the wall at the rear end of the shoulder lateral grooves 7)=−5°. The values for angles γ and δ of the Example 2 are the same values as the Example 1.

The Comparative Example 1 (see FIGS. 6(A) to 6(D)) is a conventional tire, in which the lateral grooves have a symmetrical shape as seen in the cross section. α (the angle of the wall at the front end of the central lateral grooves 6)=−5°; and β (the angle of the wall at the rear end of the central lateral grooves 6)=+5°. And, γ (the angle of the wall at the front end of the shoulder lateral grooves 7)=−5°; and δ (the angle of the wall at the rear end of the shoulder lateral grooves 7)=+5°.

The Comparative Example 2 has the same lateral grooves as the Example 1 cross section, the Comparative Example 3 has the same lateral grooves as the Example 2 cross section, and the Comparative Example 4 has the same lateral grooves as the Comparative Example 1 in cross section.

The residual cornering forces were measured by a residual cornering force measurement device of an on-stand indoor type under standard conditions when SAT (self-aligning torque)=0 kgf·m. Positive (+) values denote that the force applies to the right of the vehicle's forward direction, and negative (−) values denote that the force applies to the left of the vehicle's forward direction.

Obviously from the results shown in Table 1, the Examples 1 and 2 which embody the present invention have a residual cornering force which is positive, that is the force applies to the right of the vehicle's forward direction. Therefore, when running on the left side of the road, the force applies in a direction opposite to the lateral force of the cant, so that the vehicle's flow to the left by the cant can be suppressed.

On the contrary, the Comparative Example 1 which is conventional tire has a residual cornering force which is negative. The reason is that the force to the left of the vehicle's forward direction caused by the tread pattern is larger than the force to the right caused by attached the outermost belt cord layer inclined upward to the right. In total, the residual cornering force is negative, that is the residual cornering force arises to the left of the vehicle's forward direction. Therefore, when running on the left side of the road, the force applied in the same direction as the lateral force caused by the cant, so that the vehicle's flow to the left is enhanced.

Furthermore, in the Comparative Examples 2, 3 and 4, the force caused by attached the outermost belt cord layer upward to the left is to the left of the vehicle's forwarding direction. The force created by the tread pattern is negative, that is the force also arises to the left. Therefore, those forces apply in the same direction as the lateral force created by the cant, so that the vehicle's flow to the left is further enhanced.

Still further, in Comparative Example, when running on the left of the road, the residual cornering force to the right of the vehicles forward direction is larger than the others. Therefore, the effect on suppressing that vehicle's flow to the left is higher than the others examples. However, the Comparative Example 5 cannot apply to an ordinary vehicle because the tires wet grip performance is too low to meet minimum and after safety requirements.

Figure 2:
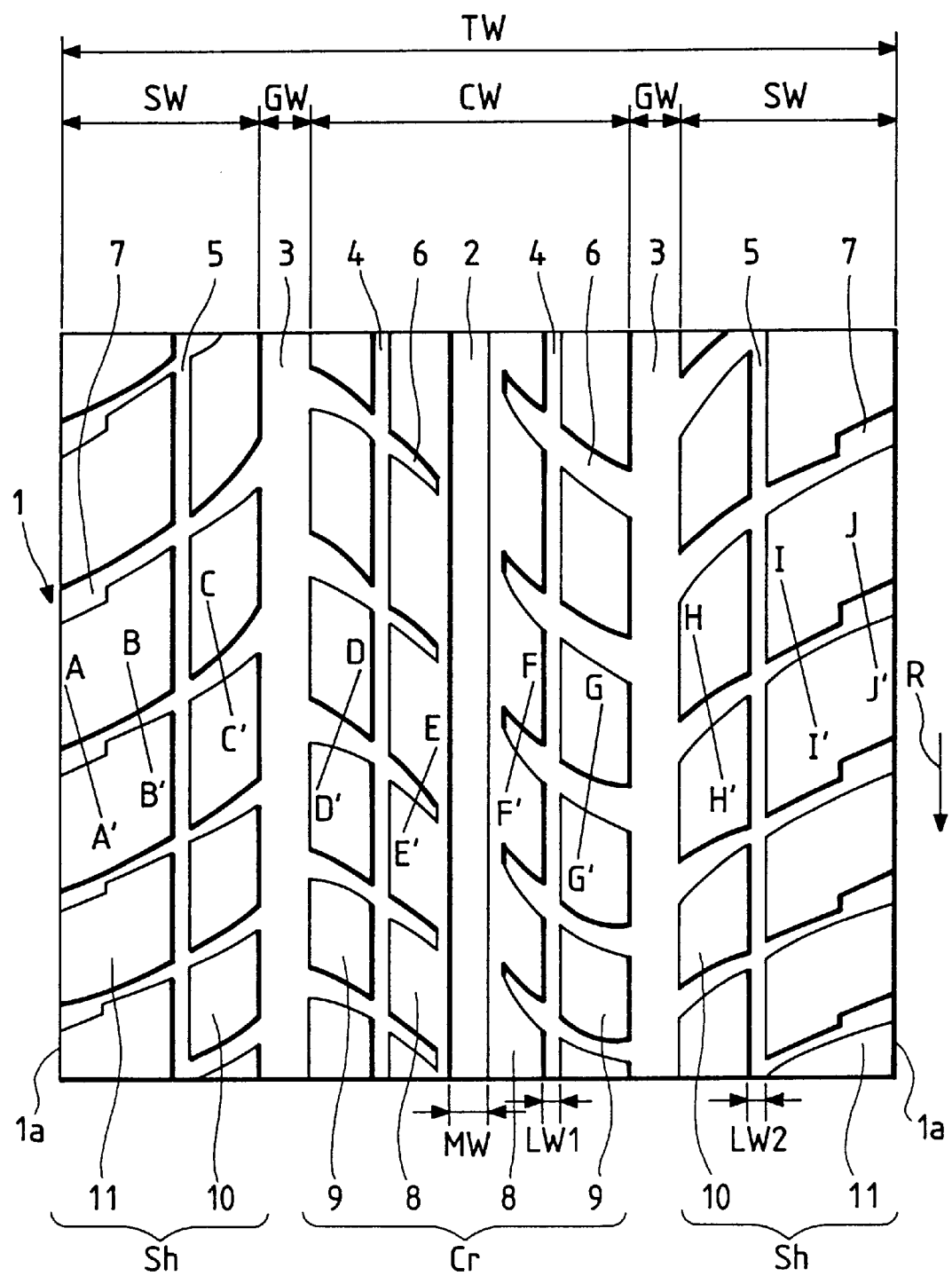
FIG. 2 is a diagram showing, in a plane view, the tread pattern of a pneumatic tire for running on the right side of the road according to the present invention.

Table 2 shows the results of measuring residual cornering forces of Examples 3, 4 and Comparative Examples 6 to 9 for running on the right side of the road. The tire size for all these examples are 185/60R14. The Examples 3, 4 and the Comparative Examples 6 to 9 have a tread pattern the same as shown in FIG. 2 and have same size and specification as each other.

With regard to the Examples 3, 4 and the Comparative Example 6, the direction of an outermost belt cord layer is inclined upward to the left with the inclination angle set at 22°. In the Comparative Examples 7, 8 and 9, the direction of an outermost belt cord layer is inclined upward to the right with the inclination angle set at 22°. The size and specification of the tread pattern on the Examples 3, 4 and the Comparative Examples 6 to 9 are the same as shown in Table 1.

In the Example 3, α (the angle of the wall at the front end of the central lateral grooves 6)=+5°; and β (the angle of the wall at the rear end of the central lateral grooves 6)=+10°.

And, in the Example 3, γ (the angle of the wall at the front end of the shoulder lateral grooves 7)=−10°; and δ (the angle of the wall at the rear end of the shoulder lateral grooves 7)=−5°. In the Example 4, α (the angle of the wall at the front end of the central lateral grooves 6)=+5°; and β (the angle of the wall at the rear end of the central lateral grooves 6)=+5°. (Thus α=β.) And, in the Example 4, γ (the angle of the wall at the front end of the shoulder lateral grooves 7)=−10°; and δ (the angle of the wall at the rear end of the shoulder lateral grooves 7)=−5°. Those γ and δ of the Example 4 are the same values as the Example 3.

The Comparative Example 6 (see FIGS. 6(A) to 6(D)) is conventional tire, and lateral grooves of the Comparative Example 6 have a symmetrical shape as seen in the cross sectional view. α (the angle of the wall at the front end of the central lateral grooves 6)=−5°; and β (the angle of the wall at the rear end of the central lateral grooves 6)=+5°. And, γ (the angle of the wall at the front end of the shoulder lateral grooves 7)=−5°; and δ (the angle of the wall at the rear end of the shoulder lateral grooves 7)=+5°.

The Comparative Example 7 has the same lateral grooves as the Example 3 as seen in the cross section, the Comparative Example 8 has the same lateral grooves as the Example 4 as seen in the cross section, and the Comparative Example 9 has the same lateral grooves as the Comparative Example 6 as seen in the cross section.

Obviously from the results shown in Table 2, the Examples 3 and 4 which embody the present invention have a residual cornering force which is negative, that is the force applies to the left of the vehicle's forwarding direction. Therefore, when running on the right side of the road, the force applies in a direction opposite to the lateral force caused by the cant, so that the vehicle's flow in response to the cant can be suppressed.

On the contrary, the Comparative Example 6 (which is a conventional tire) has a positive residual cornering force. The reason is that the force to the right of the vehicle's forward direction caused by the tread pattern is larger than the force to the left caused by the attached outermost belt cord layer inclined upward to the left. In total, the residual cornering force is positive, that is the residual cornering force arises to the right of the vehicle's forward direction. Therefore, when running on the right side of the road, the force applied in the same direction as the lateral force by the cant enhances the vehicle's flow to the right.

Furthermore, in the Comparative Examples 7, 8 and 9, the force arises to the right of the vehicle's forward direction caused by attached the outermost belt cord layer upward to the right. The force caused by the tread pattern also arises to the right. Therefore, those forces apply in the same direction as the lateral force by the cant, so that the vehicle's flow to the right is further enhanced.

In conclusion, it is clear that the residual cornering force by the tread pattern decrease in the tires according to the present invention, and that the influence of the force by the tread pattern on the residual cornering force by the belt is reduced.

Being constructed in the manner described above, the pneumatic tire of the invention offers the following advantages.

In its construction, the lateral grooves in the central portion of the tread and those in each shoulder portion are inclined in opposite directions with respect to the axial direction of the tire, and all walls of the lateral grooves in the central portion are inclined in the same direction with respect to a line in the radial direction of the tire and all walls of the lateral grooves in each shoulder portion are inclined in opposite directions to the walls of the lateral grooves in the central portion with respect to a line in the radial direction of the tire. On account of this arrangement, both the tractive force Ft originating from the crown blocks located in the central portion and the braking force Fb originating from the shoulder blocks in the shoulder portions are sufficiently reduced to decrease torque development, thereby suppressing the changes in self-aligning torque SAT. At the same time, the stiffness of the crown and shoulder blocks is varied in the running direction of the tire not only in the front part but also in the rear part, whereby the tractive force Ft and the braking force Fb are sufficiently reduced to suppress the effect the tread pattern will cause on the residual cornering force.

If the cord in the outermost layer of the belt is inclined in the same direction as the lateral grooves in the central portion of the tread, one can insure that the residual cornering force is determined by the direction of attachment of the belt cords.

If sub-grooves continuous in the circumferential direction of the tire are provided in either the central portion of the tread or each shoulder portion or both, the lateral stiffness constant of the crown or shoulder blocks in the lateral direction can be sufficiently reduced to suppress the effect the tread pattern will have on the residual cornering force.

If the lateral grooves in the central portion of the tread are open at one end to the main grooves but closed at the other end and if the lateral grooves in each shoulder portion are open to the main grooves and the tread end at opposite ends, the stability of a tire running straight and, hence, its maneuverability is improved while, at the same time, the water draining performance of the tire and, hence, its wet running performance can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pneumatic tire comprising:
 a tread having a crown portion and shoulder portions and including a tread pattern, said shoulder portions formed on both sides of said crown portion;
 a belt cord layer with a plurality of cords inclined in the same direction to produce a residual cornering force for counteracting a lateral force resulting upon engagement of the tire with a cant in a road surface when the tire is in use;
 the tread pattern including two main grooves provided symmetrically with the equatorial plane of said pneumatic tire, said main grooves dividing said shoulder portions from said crown portion and extending in the circumferential direction of said pneumatic tire;
 the thread pattern further including a plurality of central lateral grooves provided on said crown portion, said central lateral grooves extending in the direction of the tire's width, and the central lateral grooves being inclined with respect to the axial direction of the tire in the same direction as the plurality of cords in the cord layer such that a tractive force develops at each of the areas of the crown portion between the central lateral grooves as the tire engages the road surface in use; and
 the tread pattern further including a plurality of shoulder lateral grooves provided on each of said shoulder portions, said shoulder lateral grooves extending in the direction of the tire's width and being inclined in a direction opposite to that of said central lateral grooves with respect to the axial direction of said pneumatic tire such that a braking force in a direction that is opposite a direction of said tractive force is developed in each of the areas of the shoulder portions between the shoulder lateral grooves, wherein all walls of said central lateral grooves are inclined in the same direction with respect to a line in a radial direction of said pneumatic tire and all walls of said shoulder lateral grooves are inclined in an opposite direction to that of the walls of said central lateral grooves with respect to a line in the radial direction of said pneumatic tire such that the inclination of the walls of the central lateral grooves with respect to the line in the radial direction and the inclination of the walls of the shoulder lateral grooves with respect to the line in the radial direction sufficiently reduces the tractive force and the braking force respectively to suppress the effect of the tread pattern on the residual cornering force of the tire so that the residual cornering force produced by the belt counteracts the lateral force resulting upon engagement of the tire with the cant in the road surface when the tire is in use.

2. A pneumatic tire according to claim 1, further comprising sub-grooves, wherein the sub-grooves extend continuously in the circumferential direction of the tire in the crown portion.

3. A pneumatic tire according to claim 2, wherein said central lateral grooves are open at one end to the main grooves but closed at the other end and wherein said shoulder lateral grooves are open at one end to the main grooves and open at the other end to the tread edge.

4. A pneumatic tire according to claim 1, further comprising sub-grooves, wherein the sub-grooves are continuous in the circumferential direction of the tire and are provided in at least one of the crown portion and each shoulder portion.

5. A pneumatic tire according to claim 4 wherein said central lateral grooves are open at one end to the main grooves but closed at the other end and wherein said shoulder lateral grooves are open at one end to the main grooves and open at the other end to the tread edge.

6. A pneumatic tire according to claim 1 wherein said central lateral grooves are open at one end to the main grooves but closed at the other end and wherein said shoulder lateral grooves are open at one end to the main grooves and open at the other end to the tread edge.

7. A pneumatic tire according to claim 1, wherein the side walls of the central and shoulder lateral grooves each have a leading side wall of a first angle of inclination with respect to the line in the radial direction of said pneumatic tire and a trailing side wall of a second angle of inclination with respect to the line in the radial direction of said pneumatic tire, where the first and second angles differ.

8. A pneumatic tire according to claim 1, wherein the crown portion has a reduced lateral stiffness constant for suppressing the effect of the tread pattern on the residual cornering force of the tire.

9. A pneumatic tire according to claim 1, wherein the shoulder portions have a reduced lateral stiffness constant for suppressing the effect of the tread pattern on the residual cornering force of the tire.

10. A pneumatic tire according to claim 1, wherein the crown and shoulder portions have a reduced lateral stiffness constant for suppressing the effect of the tread pattern on the residual cornering force of the tire.

* * * * *